United States Patent Office 3,790,633
Patented Feb. 5, 1974

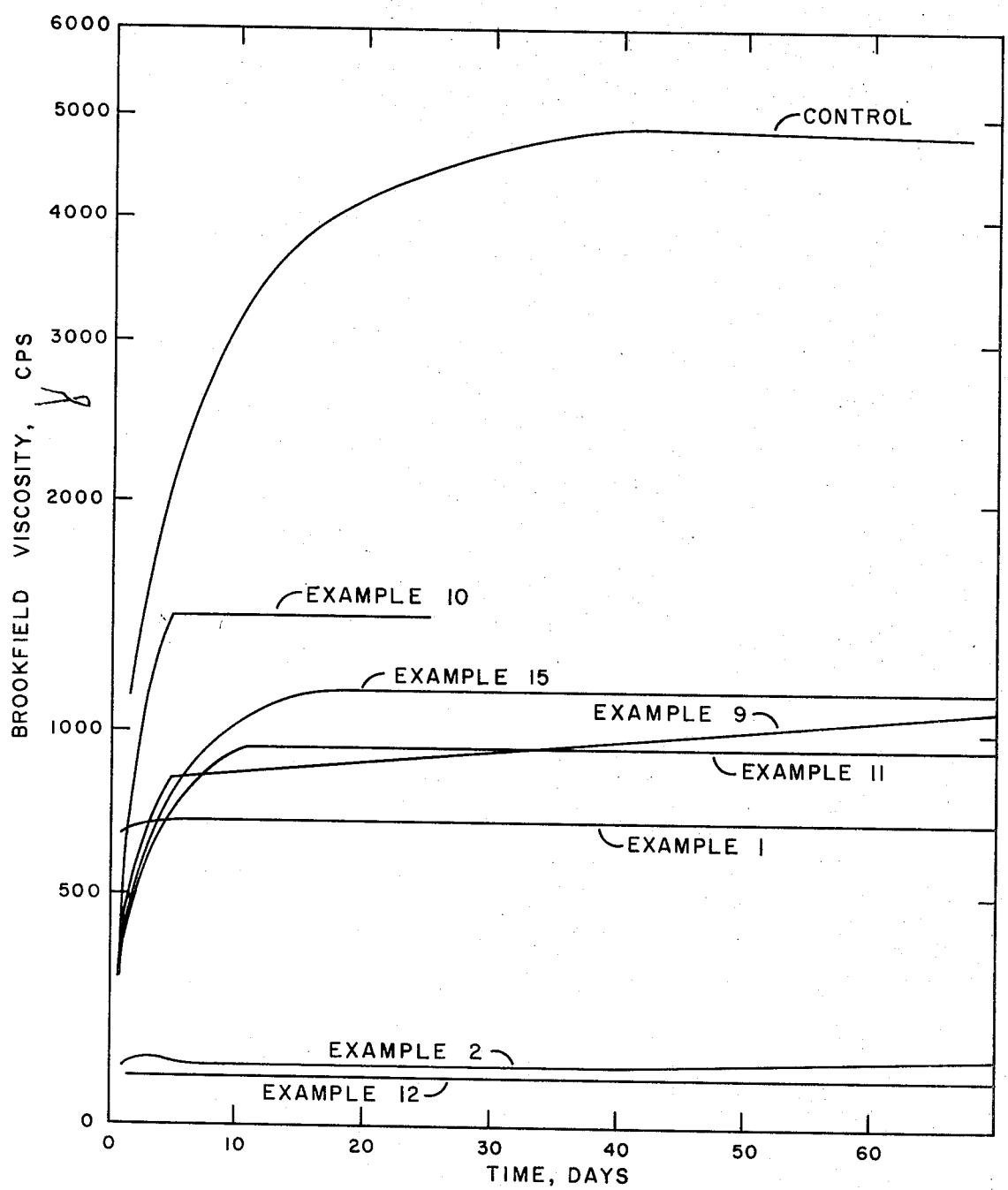

3,790,633
NOVEL LOW-VISCOSITY EPOXY CURING AGENTS
Woodrow Wilson Jedlicka, Euclid, Ohio, assignor to The Lubrizol Corporation, Wickliffe, Ohio
Continuation-in-part of abandoned application Ser. No. 76,112, Sept. 28, 1970. This application Mar. 10, 1971, Ser. No. 122,847
Int. Cl. C07c 103/30
U.S. Cl. 260—561 B
7 Claims

ABSTRACT OF THE DISCLOSURE

Novel compositions are prepared by the reaction of a polyamide or polyamine with an N-3-oxohydrocarbon-substituted 3-alkoxy-, 3-mercapto- or 3-aminopropionamide or similar compound. These compositions are useful as curing agents for polyepoxides, especially epoxy resins. Many of them also have low viscosity, low toxicity and low tendency to skin and eye irritation.

---

This application is a continuation-in-part of copending application Ser. No. 76,112, filed Sept. 28, 1970, now abandoned.

This invention relates to new compositions of matter and methods for their preparation. More particularly, it reacts to compounds having the formula $$R^7-Y_n-N=C-C-C-NH\overset{O}{\overset{\|}{C}}-CHCH_2-Z$$
$$\underset{R^1\ R^3\ R^5}{\overset{R^2\ R^4}{\phantom{X}}}\underset{R^6}{\phantom{X}}$$

wherein:

Y is $$-N-R^{10}-$$
$$\underset{R^{11}}{\phantom{X}}$$

or $Y_n$ is a polyamide radical;

Z is $OR^8$, $SR^8$ or $$N\underset{R^9}{\overset{R^8}{\diagdown}}$$

each of $R^1$, $R^2$, $R^3$, $R^4$, $R^5$, $R^7$, $R^9$ and $R^{11}$ is hydrogen or a hydrocarbon or substituted hydrocarbon radical;
$R^6$ is hydrogen, halogen or a lower alkyl or substituted lower alkyl radical;
$R^8$ is a hydrocarbon or substituted hydrocarbon radical;
$R^{10}$ is a divalent hydrocarbon or substituted hydrocarbon radical; and
$n$ is an integer from 1 to 100.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Tolyl |
| Ethyl | Xylyl |
| Propyl | Benzyl |
| Butyl | Cyclohexyl |
| Hexyl | Cyclopentyl |
| Octyl | Methylcyclopentyl |
| Decyl | Cyclopentadienyl |
| Vinyl | Vinylphenyl |
| Allyl | Isopropenylphenyl |
| Ethynyl | Cinnamyl |
| Propargyl | Naphthyl |
| Phenyl | |

$$-C_6H_3(C_2H_5)_2$$

$$-C_6H_4(CH_2)_{11}CH_3$$

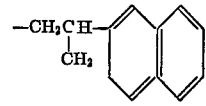

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character of reactivity of the radical.

Examples are:
  Hydroxy
  Ether (especially lower alkoxy)
  Ester (especially lower carbalkoxy)
  Aminoacyl (amide)
  Amino
  Nitro
  Cyano
  Mercapto
  Thioether
  Sulfoxy
  Sulfone
  Sulfonamide
  Sulfonic acid ester In general, no more than about three such substituent groups will be present for each 10 carbon atoms in the radical.

Preferably, the hydrocarbon or substituted hydrocarbon radicals in the compounds having the above formula are free from ethylenic and acetylenic unsaturation and have no more than about 30 carbon atoms, desirably no more than about 12 carbon atoms. A particular preference is expressed for lower hydrocarbon radicals (especially lower alkyl or aryl radicals, most often alkyl), the word "lower" denoting radicals containing up to seven carbon atoms. Still more preferably, each of $R^1$, $R^4$, $R^5$ and $R^8$ is a lower alkyl radical; each of $R^2$, $R^3$, $R^7$, $R^9$ and $R^{11}$ is hydrogen; $R^6$ is hydrogen or methyl; and $R^{10}$ is a lower alkylene radical. In the particularly desirable compounds, Z is $OR^8$.

When Y is a polyamide radical, one or more of the Y units in the chain may be derived from a polycarboxylic acid and may therefore contain one or more carboxyl groups, or one or more branched or crosslinked polyamide chains derived from said carboxyl groups. When Y is an alkyleneamino radical, $n$ is usually from 1 to about 5 at most. If Y is a polyamide radical, the value of $n$ may be much higher—about 25–50, for example.

Compositions according to this invention are within the class of compounds known as Schiff's bases and may be prepared by reacting (A) a compound of the formula

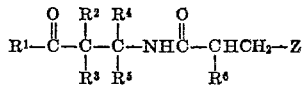

with (B) a polyamine or polyamide of the formula $R^7$—$Y_n$—$NH_2$, wherein $R^{1-6}$, Y, Z and $n$ are as defined hereinabove. The preparation of compounds useful as reagent A is described in U.S. Pats. 3,454,669 and 3,525,768, the disclosures of which are incorporated by reference herein, and in copending application Ser. No. 15,855, filed Mar. 2, 1970, now U.S. Pat. 3,647,875. Especially preferred for use as reagent A are the diacetone 3-(lower alkoxy)propionamides, wherein each of $R^1$, $R^4$ and $R^5$ is methyl, each of $R^2$, $R^3$ and $R^6$ is hydrogen, Z is $OR^8$ and $R^8$ is a lower alkyl radical, preferably methyl.

Reagent B is preferably an alkylene polyamine, especially an ethylene polyamine such as ethylene diamine, diethylene triamine, triethylene tetramine and the like; or one of the compositions sold under the trade name Versamid, which are low molecular weight, amine-terminated polyamides derived from polycarboxylic acids.

The reaction is best effected by merely heating a mixture of the two reactants at a temperature of about 25–150° C., preferably about 45–100° C. The mole ratio of the nitrogen-containing compound to the substituted alkoxypropionamide should be at least 1:1 and may be as high as 5:1, although a maximum mole ratio of about 3:1 is preferred. Ordinarily, no solvent is necessary for the reaction, but such solvents or diluents as alcohols, ethers, aromatic or aliphatic hydrocarbons or the like may sometimes be used.

The compositions prepared by the method of this invention need not, in general, be further purified before they are used as epoxy curing agents as described hereinbelow. While the analytical and spectrographic data (infrared and nuclear magnetic resonance) show that these compositions consist primarily of Schiff's bases of the above formula, they may also contain small amounts of other compounds such as gem-diamino compounds and imidazolidines. These may be represented by the formula

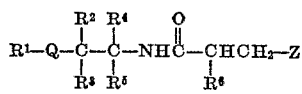

wherein Q is

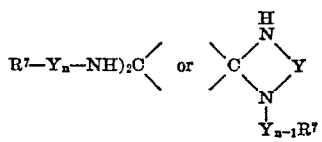

and the R radicals are as defined hereinabove. When the terminal amino groups in Q are primary amino groups, they may also react with the substituted alkoxypropionamide to form additional Schiff's base linkages. Thus, the present invention also includes mixtures containing these chemical species in addition to the Schiff's bases previously described.

Occasionally the compositions prepared by the method of this invention have a yellowish color. This color may frequently be lightened or discharged completely by treating the compositions with a small amount (generally about 0.05–1.0% by weight) of hydrogen peroxide.

The preparation of the compositions of this invention is illustrated by the following examples.

EXAMPLE 1

Diacetone 3-methoxypropionamide, 2533 parts (12.6 moles), is heated to 50° C. under nitrogen and 1298 parts (12.6 moles) of diethylene triamine is added with stirring. Stirring is continued as the mixture is heated at about 50° C. for 1½ hours. The product is the desired Schiff's base which contains 18.3% nitrogen (theoretical 18.4%).

EXAMPLE 2

The procedure of Example 1 is repeated, using 250 parts (1.25 moles) of diacetone 3-methoxypropionamide and 258 parts (2.5 moles) of diethylene triamine. The product contains 23.3% nitrogen.

EXAMPLE 3

To 542 grams of the product of Example 1, at 50° C., is added 5.4 ml. of 30% aqueous hydrogen peroxide. The mixture is stirred for 1 hour at 50° C.; an additional 5.4 ml. of the hydrogen peroxide solution is then added and stirring and heating are continued for 1 hour. The product has substantially lighter color than the starting material.

EXAMPLE 4

Following the procedure of Example 1, 302 parts (1.5 moles) of diacetone 3-methoxypropionamide is reacted with 219 parts (1.5 moles) of triethylene tetramine. A similar product is obtained.

EXAMPLE 5

Following the procedure of Example 1, 122 parts (0.5 mole) of diacetone 3-(n-butoxy)propionamide is reacted with 52 parts (0.5 mole) of diethylene triamine. The product contains 16.1% nitrogen.

EXAMPLE 6

Following the procedure of Example 1, 325 parts (1 mole) of N-(1,3-diphenyl-1-methyl-3-oxopropyl)-3-methoxypropionamide (diacetophenone 3-methoxypropionamide) is reacted with 103 parts (1 mole) of diethylene triamine. A similar product is obtained.

EXAMPLE 7

Following the procedure of Example 1, 263 parts (1 mole) of diacetone 3-phenoxypropionamide is reacted with 1 mole of a commercial mixture of polyethylene polyamines containing about 3–7 amino groups per molecule. A similar product is obtained.

EXAMPLE 8

Following the procedure of Example 1, 201 parts (1 mole) of diacetone 3-methoxypropionamide is reacted with one mole of Versamid 125, an amine-terminated polyamide of low molecular weight. A similar product is obtained.

EXAMPLE 9

Diethylene triamine, 154 parts (1.5 moles), is added over one-half hour to 321 parts (1.5 moles) of diacetone 3-dimethylaminopropionamide, at 50° C. with stirring. The reaction mixture is maintained in a nitrogen atmosphere during the addition. The mixture is stirred for one hour at 50° C. to yield a product containing 21.9% nitrogen.

EXAMPLE 10

Following the procedure of Example 9, a reaction product containing 21.4% nitrogen is obtained from 1 mole of diacetone 3-dimethylaminopropionamide and 1 mole of triethylene tetramine.

EXAMPLE 11

Following the procedure of Example 9, a product containing 19.9% nitrogen is obtained by the reaction of 1 mole of diacetone 3-diethylaminopropionamide with 1 mole of diethylene triamine.

EXAMPLE 12

Following the procedure of Example 9, a product containing 19.2% nitrogen is obtained by the reaction of equimolar amounts of diethylene triamine and diacetone 3-methylanilinopropionamide.

EXAMPLE 13

Following the procedure of Example 9, equimolar quantities of diethylene triamine and diacetone 3-di-(2-hydroxyethyl)aminopropionamide are reacted to yield a product containing 18.6% nitrogen.

EXAMPLE 14

An N-hydroxyethylated aniline is prepared by the reaction of 4 moles of aniline with 4 moles of ethylene oxide in the presence of 0.125 mole of sodium hydroxide. Equimolar amounts of the N-hydroxyethylated aniline and diacetone acrylamide are then reacted to form a 3-substituted propionamide. Following the procedure of Example 9, 2.42 moles of this substituted propionamide is reacted with 3.69 moles of diethylene triamine to yield a product containing 19.6% nitrogen.

EXAMPLE 15

Diacetone 3-(n-butylamino)propionamide is prepared by the reaction of equimolar portions of n-butylamine, diacetone acrylamide and water. Following the procedure of Example 8, a reaction product containing 19.2% nitrogen is obtained by the reaction of equimolar amounts of diacetone 3-(n-butylamino)propionamide and diethylene triamine.

EXAMPLE 16

Following the procedure of Example 8, a product containing 15.7% nitrogen and 8.75% sulfur is obtained by the reaction of equimolar amounts of diethylene triamine and diacetone 3-(n-butylmercapto)propionamide.

The compositions of this invention are useful as curing agents for polyepoxides. Their effectiveness and convenience when used as curing agents are enhanced by their relatively low toxicity and low tendency to skin and eye irritation, and their low viscosity in comparison with the chemically similar curing agents prepared by the reaction of a polyalkylene polyamine with diacetone acrylamide, as disclosed in the aforementioned U.S. Pat. 3,454,669. The change in viscosity as a function of time is shown in the drawing, in which storage time in days is plotted as as the abscissa and Brookfield viscosity in centipoises as the ordinate, the latter on a logarithmic scale. The control is a product prepared by reacting one mole of diacetone acrylamide with two moles of diethylene triamine. It will be seen that while the control increases rapidly in viscosity over thirty days to a figure of nearly 5000 centipoises, the viscosities of the compositions of this invention remain constant during prolonged storage.

In Table I are listed toxicity and skin and eye irritation results for some of the compositions of this invention as compared with diethylene triamine and Versamid 125, two commonly used epoxy curing agents. The figure given as "$LD_{50}$" is a measure of toxicity and is the weight of the composition, in grams per kilogram of body weight, required to kill 50% of the test animals. The skin and eye irritation figures are roughly proportional to the degree of irritation; that is, the higher the figure the greater the irritation. It will be seen that the toxicity and tendency to skin irritation of the compositions of this invention are substantially lower than those of diethylene triamine, and that the compositions of this invention are markedly superior to both diethylene triamine and Versamid 125 in freedom from tendency to cause eye irritation.

TABLE I

| Composition | $LD_{50}$ | Skin irritation | Eye irritation after— | | |
|---|---|---|---|---|---|
| | | | 24 hrs. | 48 hrs. | 72 hrs. |
| Product of Example 1 | 2-5 | 3.0 | 7.0 | 7.0 | 5.67 |
| Product of Example 2 | 2-5 | 3.17 | 9.0 | 7.0 | 2.67 |
| Diethylene triamine | 1-2 | 8.0 | Nor graded; eyes severely damaged | | |
| Versamid 125 | 20 | 0.08 | 32.0 | 23.7 | 15.7 |

The polyepoxides which may be cured with the compositions of this invention include those compounds having more than one vic-epoxy group. These polyepoxides may be saturated or unsaturated, aliphatic, cycloaliphatic, aromatic or heterocyclic and may be substituted if desired with non-interfering substituents, such as halogen atoms, hydroxyl groups, ether radicals and the like. They may also be monomeric or polymeric. The following are illustrative.

(I) Monomeric polyepoxides (1) Polyepoxy hydrocarbons such as butadiene dioxide, epoxidized 2,2-bis(2-cyclohexenyl)propane, epoxidized vinylcyclohexene, epoxxidized dicyclopentadiene, 1,2,5,6-diepoxy-3-hexyne, and 1,2,5,6-diepoxyhexane.

(2) Epoxy ethers such as 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4-epoxybutoxy)diphenyldimethylmethane,
1,3-bis(4,5-epoxypentoxy)-5-chlorobenzene,
1,4-bis(3,4-epoxybutoxy)-2-chlorocyclohexane,
diglycidyl ether,
1,3-bis(2-hydroxy-3,4-epoxybutoxy)benzene,
1,4-bis(2-hydroxy-4,5-epoxypentoxy)benzene, and
1,2,3,4-tetra(2-hydroxy-3,4-epoxybutoxy)butane.

(3) Epoxidized esters of polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil, fatty acids, monoglycerides of soybean, sunflower, rapeseed, hempseed, sardine and cottonseed oil.

(4) Epoxidized esters of unsaturated monohydric alcohols and polycarboxylic acids, such as di-(2,3-epoxybutyl) adipate, di - (2,3 - epoxybutyl) oxalate, di-(2,3-epoxyhexyl) succinate, di-(3,4-epoxybutyl) maleate, di-(2,3-epoxyoctyl) pimelate, di-(2,3-epoxybutyl) phthalate, di(2,3-epoxyoctyl) tetrahydrophthalate, di - (4,5 - epoxydodecyl) maleate, di-(2,3-epoxybutyl) terephthalate, di-(2,3 - epoxypentyl) thiodipropionate, di-(5,6 - epoxytetradecyl) diphenyldicarboxylate, di-(3,4-epoxyheptyl) sulfonyldibutyrate, tri-(2,3-epoxybutyl) 1,2,4-butanetricarboxylate, di-(5,6-epoxypentadecyl) tartrate, di-(4,5-epoxytetradecyl) maleate, di-(2,3-epoxybutyl) azelate, di-(3,4-epoxybutyl) citrate, di-(5,6-epoxyoctyl) cyclohexane-1,3-dicarboxylate, and di-(4,5-epoxyoctadecyl) malonate.

(5) Epoxidized esters of unsaturated alcohols and unsaturated carboxylic acids, such as 2,3-epoxybutyl 3,4-epoxypentenoate, 3,4-epoxyhexyl 3,4-epoxypentenoate, 3, 4-epoxycyclohexyl 3,4-epoxycyclohexanoate, 3,4-epoxycyclohexyl 4,5-epoxyoctanoate, and 2,3-epoxycyclohexylmethyl epoxycyclohexanecarboxylate.

(6) Epoxidized derivatives of polyethylenically unsaturated polycarboxylic acids such as dimethyl 8,9,12,13-diepoxyeicosanedioate,
dibutyl 7,8,11,12-diepoxyoctadecanedioate,
dioctyl 10, 11-diethyl-8,9,12,13-diepoxyeicosanedioate, dihexyl 6,7,10,11-diepoxyhexadecanedioate,
didecyl 9-epoxyethyl-10,11-epoxyoctadecenedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate, and
diethyl 5,6,10,11-diepoxyoctadecyl-succinate.

(7) Glycidyl polyethers of the polyhydric phenols, obtained by reacting a polyhydric phenol with a great excess of a halogen-containing epoxide in an alkaline medium. For example, bisphenol A [2,2-bis(4-hydroxyphenyl)propane] may be reacted with an excess of epichlorohydrin to form 2,2-bis(2,3-epoxypropoxyphenyl)propane. Other polyhydric phenols than can be used for this purpose include resorcinol, catechol, hydroquinone, methylresorcinol, 2,2-bis(4-hydroxyphenyl)butane, 4,4′-dihydroxybenzophenone, bis-(4-hydroxyphenyl)ethane, and 1,5-dihydroxynaphthalene. Other halogen-containing epoxides which may be used include 3-chloro-1,2-epoxybutane, 3-bromo-1,3-epoxyhexane, and 3-chloro-1,2-epoxyoctane.

(II) Polymeric epoxies (8) Polyepoxypolyhydroxy polyethers obtained by reacting, preferably in an acidic or alkaline medium, a polyhydric alcohol or polyhydric phenol with a polyepoxide, such as the reaction product of glycerol and bis(2,3-epoxypropyl) ether, the reaction product of sorbitol and bis-(2,3-epoxy-2-methylpropyl) ether, the reaction product of pentaerythritol and 1,2,4,5-diepoxypentane, the reaction product of bisphenol A and bis(2,3-epoxy-2-methylpropyl) ether, the reaction product of resorcinol and bis-(2,3-epoxypropyl) ether, and the reaction product of catechol and bis-(2,3-epoxypropyl) ether.

(9) Polyepoxy polyethers obtained by reacting, preferably in the presence of an acidic compound such as hydrofluoric acid, a halogen-containing epoxide with a polyhydric alcohol such as glycerol, propylene glycol, ethylene glycol, trimethylene glycol, butylene glycol and the like, and subsequently treating the resulting product with an alkaline reagent.

(10) Epoxy derivatives of polyesters obtained by reacting an unsaturated polyhydric alcohol with an unsaturated polycarboxylic acid or anhydride, such as the polyester formed by reacting 8,9,12,13-eicosadienedioic acid with ethylene glycol, the polyester obtained by reacting diethylene glycol with 2-cyclohexene-1,4-dicarboxylic acid, and the like.

(11) Epoxidized polymers and copolymers of diolefins, such as polybutadiene, butadiene-acrylonitrile copolymers, butadiene-styrene copolymers and the like.

(12) Hydroxy-substituted polyepoxy polyesters obtained by reacting, preferably in an alkaline medium, a slight excess of a halogen-containing epoxide with any of the polyhydric phenols described above.

(13) Glycidyl ethers of the novolac resins obtained by condensing an aldehyde with a phenol.

(14) Polymers and copolymers of epoxy-containing monomers possessing at least one polymerizable ethylenic linkage. When this type of monomer is polymerized in the substantial absence of alkaline or acidic catalysts but in the presence of a free radical catalyst, actinic light or the like, they undergo addition polymerization at the ethylenic bond leaving the epoxy group unaffected. These monomers may be polymerized with themselves or with other ethylenically unsaturated monomers, such as styrene, vinyl acetate, acryonitrile, methacrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative polymers include poly(allyl 2,3-epoxypropyl ether), poly(2,3-epoxypropyl crotonate), the copolymer of styrene with allyl 2,3-epoxypropyl ether, the copolymer of allyl benzoate with methallyl 3,4-epoxybutyl ether, poly-(vinyl 2,3-epoxypropyl ether), the copolymer of vinyl acetate with allyl glycidyl ether, and poly-(4-glycidyloxystyrene).

Particularly preferred for use as epoxy-containing compounds are the polymeric polyepoxides listed above and especially the so-called ethoxyline resins, which are obtained by condensing polyhydric phenols with epichlorohydrin.

Curing of polyepoxides with the compositions of this invention may usually be effected by merely mixing the two in proportions of about 5-75 parts, most often about 10-50 parts, of the composition of this invention per 100 parts of polyepoxide. The mixtures thus obtained generally have a measurable "pot life" and are considered part of the invention, but the components thereof react with each other upon standing to form an infusible, cured resin.

The effectiveness of some of the compositions of this invention as curing agents is shown in a series of tests performed on cured resins prepared by the reaction of such compositions with a commercially available polyepoxy compounds prepared from epichlorohydrin and bisphenol A and identified by the trademark Epon 828. Sample A contains 100 parts of the resin and 25 parts of the product of Example 1; Sample B contains 100 parts of the resin and 45 parts of the product of Example 2. Each of these samples is tested for tensile strength and percent elongation (ASTM D638), Izod impact strength (ASTM D256) and compressive strength and yield (ASTM D695). Each figure is an average of several test runs. The results are given in Table II.

TABLE II

| Sample | A | B |
| --- | --- | --- |
| Tensile strength, p.s.i | 11,900 | 8,528 |
| Percent elongation | 6.4 | 5.2 |
| Izod impact strength, ft.-lb./in | 0.56 | 0.458 |
| Compressive strength, p.s.i | 21,047 | 21,208 |
| Compressive yield, p.s.i | 14,535 | 11,595 |

The compositions of this invention are particularly useful as curing agents for seamless epoxy flooring. The chemicals used in flooring compositions must be compatible to form a single package with a long enough pot life to permit easy application, and yet a short enough cure time to make the floor usable within a reasonable period. The prepared floor must be hard and resistant to blush, fish-eyeing and crawling, and must be stable to ultraviolet light such as sunlight. The curing agent package itself must be stable over relatively long storage periods. It has been found that a number of curing agent packages containing the compositions of this invention meet these conditions. Illustrative is a package containing the following ingredients, the amounts given being parts per 100 parts of the epichlorohydrin-bisphenol A resin referred to hereinabove as Epon 28:

| | Parts |
| --- | --- |
| Product of Example 1 | 50 |
| Dibutyl phthalate | 2 |
| Phenol | 6 |

What is claimed is:
1. A compound having the formula

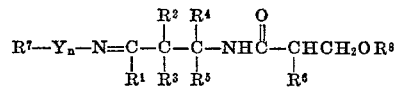

wherein:

Y is

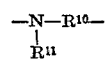

or $Y_n$ is a polyamide radical;
each of $R^1$, $R^2$, $R^3$, $R^4$, $R^5$, $R^7$ and $R^{11}$ is hydrogen or a hydrocarbon radical;
$R^6$ is hydrogen, halogen or a lower alkyl radical;
$R^8$ is a hydrocarbon radical;

$R^{10}$ is a divalent hydrocarbon radical; and
$n$ is an integer from 1 to 100.

2. A compound according to claim 1 wherein each of $R^1$, $R^4$, $R^5$ and $R^8$ is a lower alkyl radical; each of $R^2$, $R^3$, $R^7$ and $R^{11}$ is hydrogen; $R^6$ is hydrogen or methyl; and $R^{10}$ is a lower alkylene radical.

3. A compound according to claim 2 wherein Y is

—NH—$R^{10}$— and $n$ is 1–5.

4. A compound according to claim 3 wherein each of $R^1$, $R^4$ and $R^5$ is methyl and $R^6$ is hydrogen.

5. A compound according to claim 4 wherein $R^8$ is methyl.

6. A compound according to claim 4 wherein $R^{10}$ is ethylene.

7. A compound according to claim 6 wherein $R^8$ is methyl.

References Cited

UNITED STATES PATENTS

| | | | |
|---|---|---|---|
| 3,317,603 | 5/1967 | Blance et al. | 260—561 R |
| 3,257,449 | 6/1966 | Kalopissis et al. | 260—561 S X |
| 3,454,669 | 7/1969 | Laudise | 260—830 |
| 3,651,140 | 3/1972 | Coleman et al. | 260—561 N |

OTHER REFERENCES

Royals, E.: Adv. Org. Chem., 1956, Reprint, Prentice-Hall, p. 650.

LEWIS GOTTS, Primary Examiner

E. G. LOVE, Assistant Examiner

U.S. Cl. X.R.

260—2 N, 2 R, 18 EP, 47 EP, 59.75 EP, 78.4 EP, 80 R, 80.3 N, 88.3 A, 94.2 R, 561 A, 561 S